United States Patent [19]
Kwan et al.

[11] Patent Number: 6,158,002
[45] Date of Patent: Dec. 5, 2000

[54] METHOD AND APPARATUS OF BOOT DEVICE SWITCHING BY A FLOPPY DISK

[75] Inventors: Tony G. Kwan; Yafu J. Ding, both of Milpitas, Calif.

[73] Assignee: Adaptec, Inc., Milpitas, Calif.

[21] Appl. No.: 09/134,760

[22] Filed: Aug. 14, 1998

[51] Int. Cl.[7] .................................................. G06F 9/445
[52] U.S. Cl. ................................................................ 713/2
[58] Field of Search .................................................. 713/2

[56] References Cited

U.S. PATENT DOCUMENTS

| | | | |
|---|---|---|---|
| 5,325,532 | 6/1994 | Crosswy et al. | 395/700 |
| 5,418,918 | 5/1995 | Vander Kamp et al. | 395/375 |
| 5,692,190 | 11/1997 | Williams | 395/652 |
| 5,694,600 | 12/1997 | Khenson et al. | 395/652 |
| 5,933,631 | 8/1999 | Mealey et al. | 395/652 |
| 6,016,402 | 1/2000 | Thomas et al. | 395/652 X |

OTHER PUBLICATIONS

Unknown, "ASUS PCI–DA2100 PCI to SCSI Disk Array Controller", User's Manual Hardware Installation, Rev. 1.22, Nov. 1996, ASUSTeK Computer, Inc.

Unknown, "ASUS P2L97–S Pentium II Motherboard", User's Manual, Rev. 1.05, Sep. 1997, ASUSTeK Computer, Inc.

Unknown, "ASUS P2L97 Pentium II Motherboard", User's Manual, Rev. 1.05, Sep. 1997, ASUSTeK Computer, Inc.

*Primary Examiner*—Thomas M. Heckler
*Attorney, Agent, or Firm*—Martine Penilla & Kim, LLP

[57] ABSTRACT

A system for enabling booting to a desired drive of a computer system having a floppy drive, an IDE/EIDE storage drive, and a SCSI storage drive. The system includes a floppy disk that is configured to be inserted into the floppy drive. The floppy disk contains a media containing program instructions that are configured to be executed upon initiating a system BIOS of the computer system. The execution of the program instructions includes executing a boot code stored on the media of the floppy disk. The boot code is configured to scan a number of PCI buses of the computer system to identify host adapters that are connected to respective ones of the number of PCI buses. Further, the system includes executing a BIOS code for each of the host adapters which causes an assignment of drive numbers to devices connected to the host adapters and the computer system. Then, swapping the assignment of drive numbers such that the desired drive is assigned a drive number 80*h*. The master boot record (MBR) of the desired drive will then be accessed upon an INT 13 call, which causes the completion of the boot process that enables an operating system (OS) stored in the desired drive.

20 Claims, 5 Drawing Sheets

METHOD AND APPARATUS OF BOOT DEVICE SWITCHING BY A FLOPPY DISK

BACKGROUND OF THE INVENTION

1. Field of the Invention

This invention relates generally to computer systems, and more particularly to computer systems that can be configured to boot from a desired storage device using the standard boot sequence priority defined by a system BIOS code.

2. Description of the Related Art

Computer systems today typically have several host adapters to enable the computer system to communicate with internal and external peripheral devices, and communicate over a network. Commonly, the host adapters are connected to peripheral devices (e.g., drives) that enable data to be written or read by the computer system to or from various storage media. For example, such devices include floppy drives, tape drives, hard drives, CD-ROMs, CD-R drives, scanners, and DVD drives, among others. These peripheral devices generally communicate with a computer system through specific interface protocols, which most commonly include what are known as IDE/EIDE protocols and SCSI protocols. Thus, peripheral device manufactures will generally manufacture protocol specific devices, which are designated to be, for example, either an IDE/EIDE device or a SCSI device.

As is well known, the basic operation of a computer system includes booting its basic software algorithms to prepare the computer system for normal operation that is controlled by its operating system (OS). Such booting is accomplished by reading and then executing commands of the basic software algorithms from a particular medium (typically the main hard disk). Therefore, the booting operation will require identifying the device (which is connected to the computer system) that has the medium that is to be read. The identified device is commonly known as "the boot device."

Conventionally, booting operations controlled by a system BIOS of a computer system are rigidly fixed to search for IDE/EIDE devices and then search for lower priority SCSI devices, and identifying the first found IDE/EIDE device as the boot device. Accordingly, if an IDE/EIDE device is connected to the computer system (which is most commonly the case), the system will automatically boot from the IDE device, whether or not the user prefers to boot from the IDE/EIDE device. Even if the user prefers to boot from a higher performance SCSI device, the user's computer system will not allow the user to indicate a booting preference.

With this in mind, FIG. 1A shows a simplified diagram of a computer system 100 including a motherboard 102 that is used to interconnect peripheral devices to the computer system. In this example, the motherboard 102 includes a PCI bus 104 which typically has a number of PCI slots that are configured to receive host adapter cards that interconnect to peripheral devices. Most computer systems 102 also include connectors such as IDE connectors 106 (or EIDE connectors) which interconnect to well known storage devices. For simplicity, two host adapters 108a and 108b are shown coupling up to the PCI bus 104 and respectively connecting to SCSI hard drives 110a and 110b. Typically, the host adapters 108 have option ROM chips that contain a basic input/output system (BIOS) 112. As is well known, the BIOS 112 enables the card to communicate its attributes (and identify which peripheral devices are connected thereto) through the PCI bus 104 during a boot-up process that is controlled by a system BIOS. A computer's system BIOS is typically integrated into the motherboard 102 in the form of a ROM chip or suitable flash memory chip.

However, if a host adapter does not have a BIOS 112, such as host adapter 108a, devices connected to the host adapter 108 cannot operate as boot devices. That is, the hard drive 110a may not function as the boot device for the computer system 100, however, the hard drive 110b connected to the host adapter 108b may function as a boot device. As mentioned above, an IDE connector 106 is shown connected to an IDE hard drive 110c. Accordingly, when an IDE hard drive 110c is connected to an IDE connector on the motherboard 102, that hard drive 110c will be given boot priority over SCSI hard drives 110.

FIG. 1B shows a boot priority list 150 which is followed by the system BIOS of a computer system 100 during its booting process. As pictorially illustrated, a floppy disk drive 152 is given highest priority by the system BIOS, and if no floppy disk is inserted into the computer system, the next highest boot priority will be IDE drive(s) 154. If there is no IDE drive connected to an IDE connector 106, the system may then boot from a SCSI drive at 156, which is the lowest boot priority type of device. Although the floppy disk drives 152 are given the highest boot priority by the system BIOS of a computer system, most computer systems are required to have any floppy disks ejected from the drive before the boot process begins in order to enable an IDE drive to be the boot device.

Alternatively, if there are no IDE drives 154 connected to the computer system, the computer system may be booted from a SCSI drive 156, which is given the lowest boot priority by the system BIOS. However, it is important to note that even though a SCSI drive is allowed to be a boot device, its host adapter 108 must have a BIOS 112 in order to enable the peripheral device connected thereto to be the boot device. Even though there is oftentimes a need to boot from a particular hard drive (having a backup data set, for example), when the host adapter 108 does not have a BIOS, booting from that device cannot be performed.

For completeness, it should be understood that the system BIOS will assign drive numbers to the peripheral devices connected to the computer system in accordance with the boot priority list 150 of FIG. 1B. Thus, assuming that no floppy disk drive is inserted in the computer system during the booting process, the system BIOS will typically assign drive numbers starting from 80$h$ (in hexadecimal format) up to 83$h$ for IDE devices, and drive numbers between 84$h$ and 87$h$ for all remaining SCSI devices. As is well known, a device that is assigned 80$h$ during the boot process by the system BIOS will always be designated as the boot device. That is, the device that is assigned 80$h$ as its drive number will be the boot device regardless of the fact that the user would like to boot from one of the SCSI devices.

Recently, several backup and restoration products have been developed which, upon experiencing a hard disk crash, the user may want to re-boot from a backup SCSI drive. Unfortunately, because the computer system will always attempt to rigidly boot from the primary hard drive, which is typically an IDE/EIDE drive, the user will not be able to resume work from a backup SCSI drive.

In view of the foregoing, there is a need for a technique that will enable a user to select which peripheral device to boot from, irrespective of whether the selected peripheral device is connected to a host adapter with a SCSI BIOS, and irrespective of the fact that a IDE/EIDE hard drive is also connected to the computer system.

SUMMARY OF THE INVENTION

Broadly speaking, the present invention fills these needs by providing a floppy disk that has program instructions that enable a user to select a desired drive to boot from when the floppy disk is inserted in the computer's floppy disk drive. It should be appreciated that the present invention can be implemented in numerous ways, including as a process, an apparatus, a system, a device, a method, or a computer readable medium. Several inventive embodiments of the present invention are described below.

In one embodiment, a method for booting from a desired peripheral device that is connected to a computer system having a floppy disk drive is disclosed. The method includes inserting a floppy media into the floppy disk drive of the computer system and turning ON the computer system to enable a system BIOS of the computer system. The method further includes executing a boot code stored on the floppy media. The boot code is configured to scan a number of buses of the computer system to identify host adapters that are connected to respective ones of the number of buses. Then, executing a BIOS code for each of the host adapters which causes an assignment of drive numbers to peripheral devices connected to the host adapters. Next, the assigned drive numbers are rearranged in order to assign 80h to the desired peripheral device, which enables booting the computer system from the desired peripheral device.

In another embodiment, a system for enabling booting to a desired drive of a computer system having a floppy drive, an IDE/EIDE storage drive, and a SCSI storage drive is disclosed. The system includes a floppy disk that is configured to be inserted into the floppy drive. The floppy disk contains a media containing program instructions that are configured to be executed upon initiating a system BIOS of the computer system. The execution of the program instructions includes executing a boot code stored on the media of the floppy disk. The boot code is configured to scan a number of PCI buses of the computer system to identify host adapters that are connected to respective ones of the number of PCI buses. Further, the system includes executing a BIOS code for each of the host adapters which causes an assignment of drive numbers to devices connected to the host adapters and the computer system. Then, swapping the assignment of drive numbers such that the desired drive is assigned a drive number 80h. The master boot record (MBR) of the desired drive will then be accessed upon an INT 13 call, which causes the completion of the boot process that enables the computer's operating system (OS).

In yet a further embodiment, a floppy disk computer readable media that is configured to be inserted into a floppy disk drive of a computer system to enable booting to a desired drive is disclosed. The floppy disk computer readable media contains program instructions that are configured to be executed first upon booting up of the computer system by a system BIOS, according to boot priority. The floppy disk computer readable media includes program instructions for executing a boot code stored on the media of the floppy disk. The boot code is configured to scan a number of PCI buses of the computer system to identify host adapters that are connected to respective ones of the number of PCI buses. Further included are program instructions for executing a BIOS code for each of the host adapters which causes an assignment of drive numbers to devices connected to the host adapters and the computer system. Program instructions are also included to enable swapping of the assigned drive numbers, such that the desired drive is assigned a drive number 80h.

As will be appreciated upon studying the drawings and detailed description, the embodiments of the present invention enable a computer user to boot from any desired storage device, irrespective of whether an IDE/EIDE device is connected to the computer system and irrespective of whether a host adapter (that connects to the desired boot drive) has a BIOS chip. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and system that implements a floppy disk containing program instructions that are called and executed by a computer's system BIOS to enable a user to select a desired drive to boot from when the floppy disk is inserted in the computer's floppy disk drive. Further yet, the program instructions enable a user to boot from SCSI devices connected to host adapters that either have or do not have their own BIOS code, and further enable the user to select booting to a SCSI device when an IDE/EIDE device is connected to the computer system. It will be obvious, however, to one skilled in the art, that the present invention may be practiced without some or all of these specific details. In other instances, well known process operations have not been described in detail in order not to unnecessarily obscure the present invention.

Figure 1A:
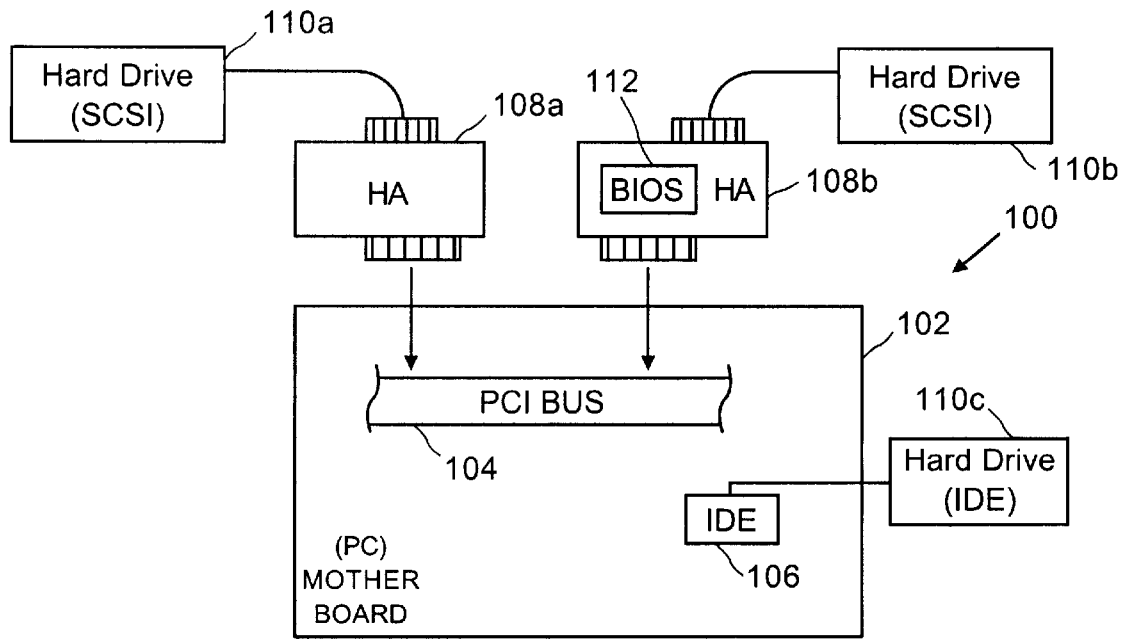
FIG. 1A shows a simplified diagram of a computer system including a motherboard that is used to interconnect peripheral devices to the computer system.
Figure 1B:
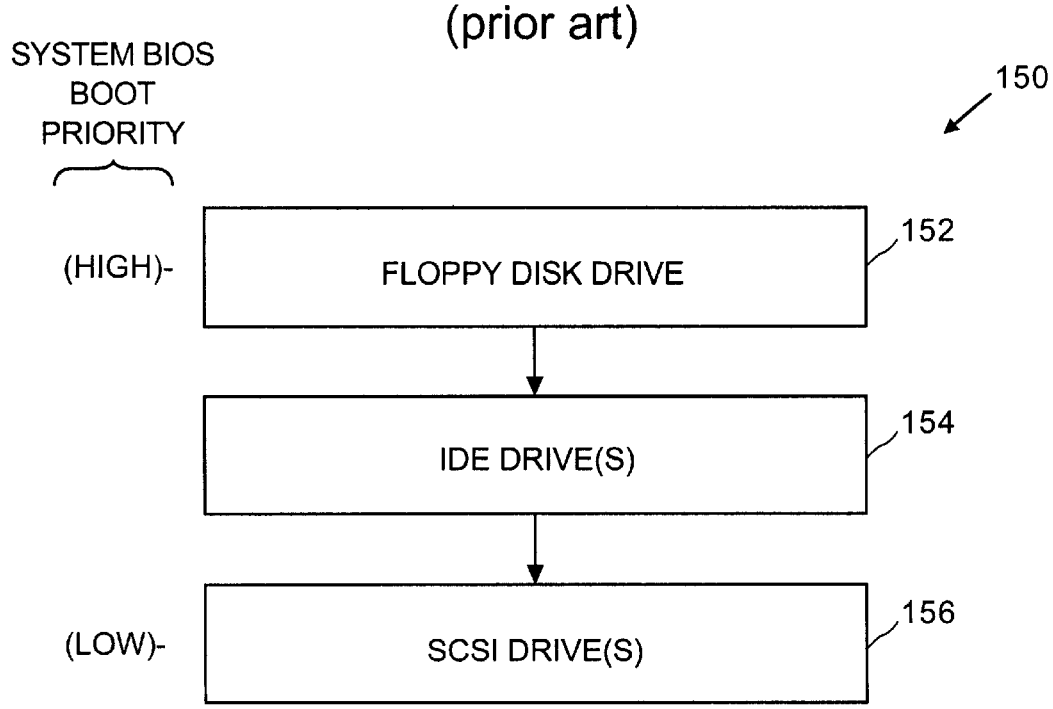
FIG. 1B shows a boot priority list which is followed by the system BIOS of a computer system during its booting process.
Figure 2A:
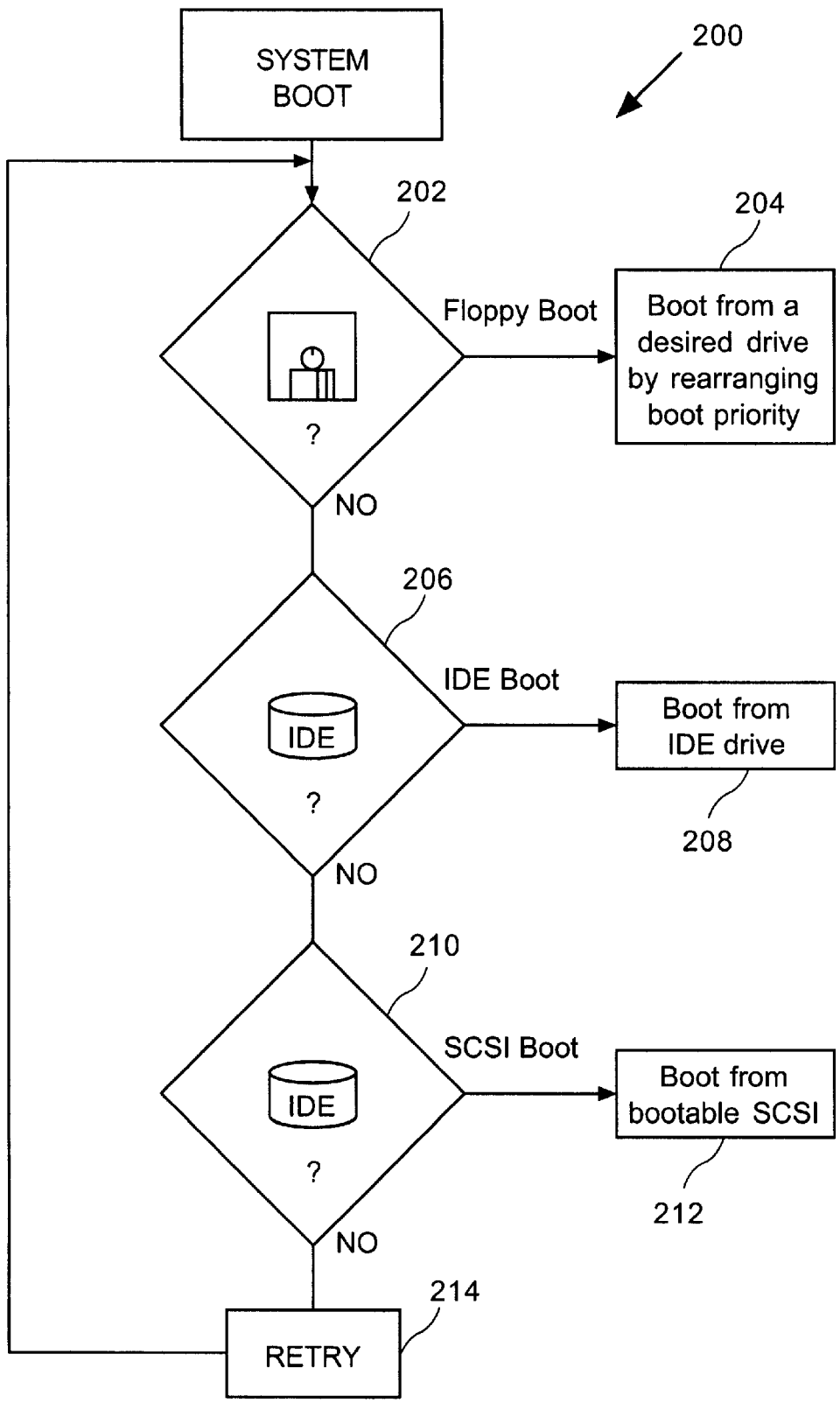
FIG. 2A is a flowchart illustrating the boot process performed by a standard system BIOS adhering to the boot priority of FIG. 1B, in accordance with one embodiment of the present invention.

FIG. 2A shows a flowchart 200 illustrating the boot process performed by a standard system BIOS adhering to the boot priority 150 of FIG. 1B, in accordance with one embodiment of the present invention. Initially, when the system is booted, the system BIOS will determine whether there is a floppy disk inserted in the computer in decision operation 202. If no floppy disk is inserted in the computer, the system BIOS will move to determine if there are any IDE storage devices connected to the computer in decision operation 206. If there is an IDE storage device connected to the computer system, the method will proceed to operation 204 where the boot is performed from the IDE drive.

Alternatively, if it is determined that a floppy disk in accordance with one embodiment of the present invention is inserted in the computer system, the method will proceed to an operation 204 where the user is allowed to boot from a desired drive by re-arranging the boot priority. As will be described in greater detail below, the floppy disk that is inserted into the computer system contains program instructions that will enable the user to select which device to boot from whether or not there is an IDE device connected to the computer system, and will also enable booting from a peripheral device when that peripheral device is connected to a host adapter that does not have its own BIOS, Proceeding along the boot flowchart 200, if it is determined in operation 206 that there is no IDE storage device connected to the computer system, the method will proceed to a decision operation 210 where it is determined if there is a SCSI storage device connected to the computer system. If there is, the method will proceed to an operation 212 where the computer may be booted from a bootable SCSI device. In this case, the SCSI device must be connected to a host adapter that has a BIOS. If there is no SCSI device connected to the computer system, the method will proceed to operation 214 where the user is prompted to retry booting the computer system, and the method will proceed back up to decision operation 202.

It should be evident from the boot flowchart 200, that the present invention implements the use of a floppy disk that has a computer-readable media that includes program instructions that will enable a user to boot from a desired drive by re-arranging the boot priority by assigning 80$h$ to the desired boot device. Therefore, the present invention takes advantage of the fact that the system BIOS of a computer system will generally always have the floppy disk drive as the highest boot priority as described with reference to FIG. 1B.

Figure 2B:
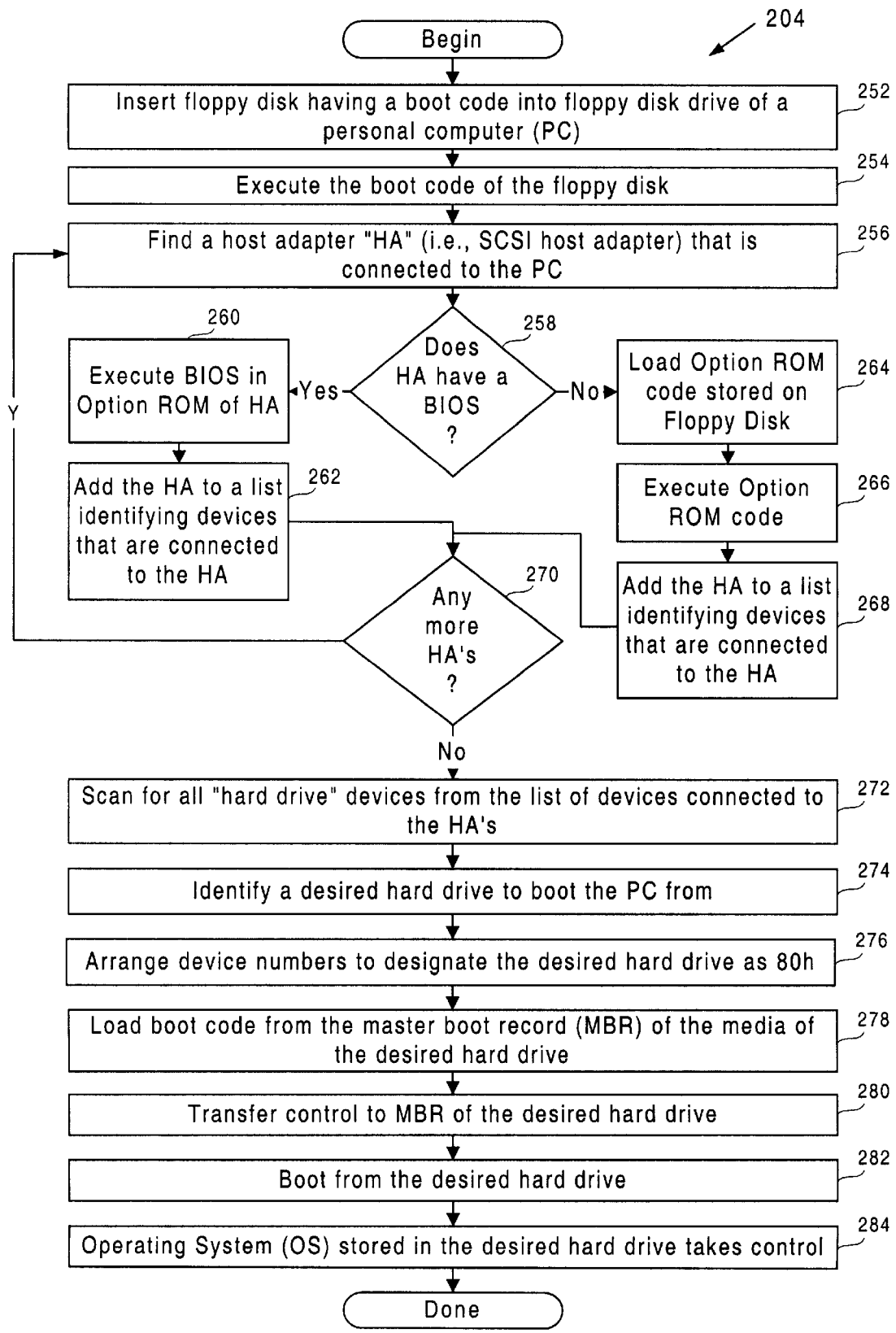
FIG. 2B illustrates the method operations performed by the program instructions that are stored in the floppy disk computer-readable media in accordance with one embodiment of the present invention.

FIG. 2B illustrates the method operations performed by the program instructions that are stored in the floppy disk computer-readable media in accordance with one embodiment of the present invention. The method operation of booting from a desired drive by re-arranging the boot priority is therefore begun when in operation 252, the floppy disk having a boot code is inserted into a floppy disk drive of a personal computer.

Once the floppy disk has been inserted into the floppy disk drive, the system boot may begin when the boot code of the floppy disk is executed in operation 254. Next, the method will proceed to operation 256 where the boot code is designed to find a host adapter "HA" (e.g., a SCSI host adapter) that is connected to the personal computer "PC." Typically, the host adapter is connected to the motherboard of the PC via a PCI slot as described with reference to FIG. 1A above. Next, the method will proceed to a decision operation 258 where it is determined if the host adapter has its own BIOS. If the host adapter does not have its own BIOS, the method will proceed to an operation 264 where option ROM code that is stored on the floppy disk is loaded. As a result, the problem of not being able to boot from a host adapter that does not have a hardware option ROM chip is overcome because the floppy disk will provide the code. Once the option ROM code that is stored on the floppy disk is loaded, the method will proceed to an operation 256 where the option ROM code is executed.

After the code has been executed, the method will proceed to an operation 268 where the host adapter is added to a list that identifies devices that are connected to the host adapter. Alternatively, if it is determined in operation 258 that the host adapter does have its own BIOS, the method will proceed to an operation 260 where the option ROM BIOS of the host adapter is executed. Once it has been executed in operation 260, the method will proceed to an operation 262 where the host adapter is added to a list that identifies the devices that are connected to the host adapter. At this point, the method will proceed to decision operation 270 where it is determined if there are anymore host adapters. If there are more host adapters, the method will proceed back up to operation 256 where the boot code will determine if there is a next host adapter that is connected to the PC. At this point, the method will once again proceed down to decision operation 258 to determine if the newly-found host adapter has its own BIOS.

If it has its own BIOS, the BIOS will be executed and the devices connected to the host adapter will be listed, and alternatively, if the host adapter does not have its own BIOS, a BIOS that is stored in the floppy disk will be executed to enable the devices connected to the host adapter to be listed. Accordingly, the method will return back to decision operation 270 and back up to operation 256 until all host adapters have been identified and all devices connected to the host adapters have been identified in the list. Once there are no more host adapters, the method will proceed to operation 272. In operation 272, a scan is performed to identify all hard drive devices from the list of the devices connected to the host adapters. Now that all of the hard drive devices have been identified from the list, the method will proceed to an operation 274 where the user may be prompted to identify a desired hard drive to boot the PC from.

After the desired hard drive has been identified by the user, the method will proceed to an operation 276 where the device numbers (80$h$ through 87$h$) are re-arranged to designate the desired drive to be 80$h$. As mentioned above, when a drive is assigned the drive number 80$h$, that drive will be the boot device which will respond to an INT13 call. The method will now proceed to an operation 278 where the boot code is loaded from the master boot record (MBR) of the media of the desired hard drive. Once the boot code is loaded from the master boot record in operation 278, the method will proceed to an operation 280 where control is transferred to the MBR of the desired hard drive.

The method now proceeds to an operation 282 where booting is performed from the desired hard drive that was assigned the drive number 80$h$ during the re-arranging of device numbers in accordance with the user's identified desired hard drive. At this point, the method will proceed to an operation 284 where the operating system (OS) stored in the desired hard drive takes control and the method will end.

Figure 3:
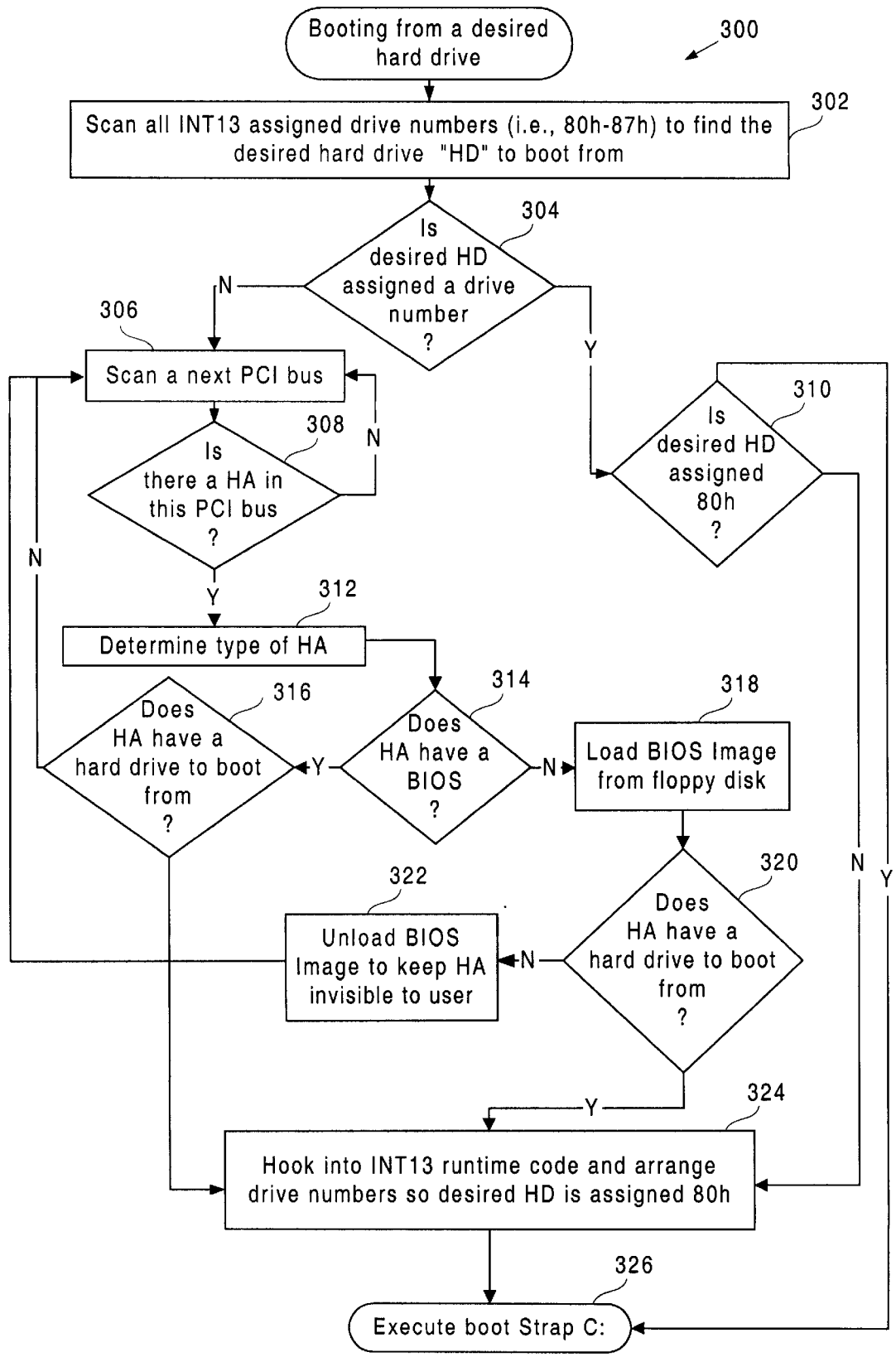
FIG. 3 illustrates a more detailed flowchart diagram that describes the process of booting from a desired hard drive in accordance with one embodiment of the present invention.

FIG. 3 illustrates a more detailed flowchart diagram 300 that describes the process of booting from a desired hard drive. In the following example, the method is preferably directed situations where the desired drive is preset to be a particular type of drive. In one embodiment, the particular type of drive may be a removable media drive, such as a Jazz™ drive that is available from Iomega Corporation of Roy, Utah, or the like. Of course, the desired drive can be set to be any other type of drive that has the capability of storing a sufficient amount of data that it can be a boot device. As described in a copending U.S. patent application having Ser. No. 09/110,783, entitled "An Intelligent Backup and Restoring System and Method For Implementing the Same," and assigned to the assignee of the present invention, the ability to boot from a desired peripheral device is particularly advantageous in backup and restore products. U.S. patent application having Ser. No. 09/110,783 is hereby incorporated by reference.

In this embodiment, the method begins at an operation 302 where all INT 13 assigned drive numbers (i.e., 80*h* through 87*h*), are scanned to find the desired hard drive "HD" to boot from. Once all INT 13 assigned drive numbers have been scanned, the method will proceed to a decision operation 304 where it is determined if the desired hard drive is assigned a drive number. If it is assigned a drive number, the method will proceed to a decision operation 310 to determine if the desired hard drive is already assigned 80*h* as a drive number. If the drive number is already 80*h* for the desired hard drive, the method will proceed to operation 326 where bootstrap C: is executed. As is well known to those skilled in the art, when bootstrap C: is executed, the system BIOS will be done executing and control will be transferred to the MBR of the boot device.

Referring back to operation 304, if it is determined that the desired hard drive is not assigned a drive number, the method will proceed to operation 306 where an initial PCI bus is scanned. Once a PCI bus has been scanned, the method will proceed to a decision operation 308 where it is determined if there is a host adapter in the current PCI bus. If there is no host adapter in a current PCI bus, the method will proceed back up to operation 306 where a scan to a next PCI bus is performed. When there is a host adapter in the PCI bus, the method will proceed to an operation 312 where an inquiry is made as to the type of host adapter (e.g., is this an Adaptec host adapter?). Once the type of host adapter has been identified, the method will proceed to a decision operation 314. In operation 314, it is determined whether the current host adapter has its own BIOS. If it does not have its own BIOS, the method will proceed to an operation 318 where a BIOS image is loaded from the floppy disk media. Alternatively, if it is determined that the host adapter does have its own BIOS, the method will proceed to a decision operation 316.

In operation 316, it is determined whether the host adapter has a hard drive to boot from. If the current host adapter does not have a hard drive to boot from, the method will proceed back up to operation 306 where a scan is performed to the next PCI bus. Referring back to operation 318, once the BIOS image is loaded from the floppy disk drive for a host adapter that does not have a BIOS, the method will proceed to an operation 320 where it is determined whether the host adapter has a hard drive to boot from. If the host adapter does not have a hard drive to boot from, the method will proceed to an operation 322 where the BIOS image that was loaded from the floppy disk is unloaded (i.e., erased from RAM) to keep the host adapter invisible to the user.

The method will then proceed back up to operation 306 where the next PCI bus is scanned. Alternatively, if it is determined in operation 320 that the host adapter does have a hard drive to boot from, the method will proceed to an operation 324. In operation 324, the method will hook into INT 13 runtime code and arrange drive numbers so the desired hard drive is assigned 80*h*. Once the desired hard drive has been assigned 80*h*, the method will proceed to operation 326 where the bootstrap C: operation is executed. Referring now to operation 310, if it was determined that the desired hard drive was not assigned 80*h*, the method will proceed to an operation 324 where the operation of hooking into INT 13 runtime code and arranging of the drive numbers is performed so the desired hard drive is assigned drive number 80*h*.

As can be appreciated from the above-described flowchart, the present invention will enable booting from a desired hard drive when there is an IDE/EIDE storage device connected to the computer system, and when a host adapter does not have its own BIOS. This is because the boot code in the floppy disk media will enable the user to select a desired hard drive to boot from, and if the desired hard drive is connected to a host adapter that does not have it own BIOS, a BIOS code that is stored in a floppy disk drive will be loaded to enable access to that desired hard drive. In addition, it should be kept in mind that it does not matter that an IDE hard drive is connected to the computer system because priority is always given by the system BIOS to the floppy disk drive. As such, the boot code in the floppy disk drive will enable the user to reassign the drive numbers such that the desired hard drive will be assigned 80*h* and booting will be performed from that desired hard drive.

Figure 4A:
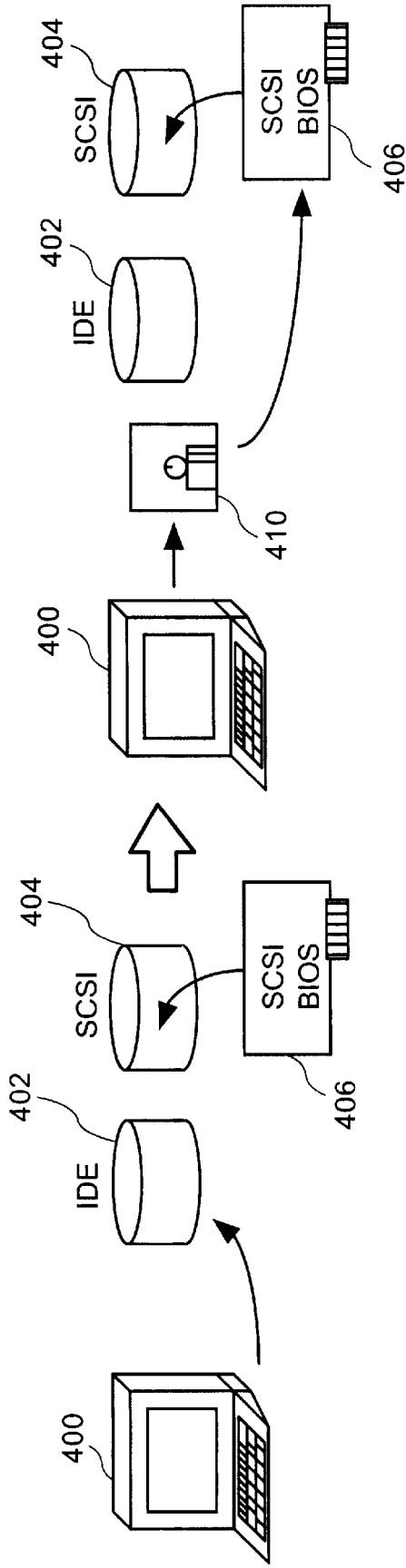
FIG. 4A and 4B pictorially illustrate the advantages of the present invention which will enable the user to boot from a desired hard drive in accordance with one embodiment of the present invention.
Figure 4B:
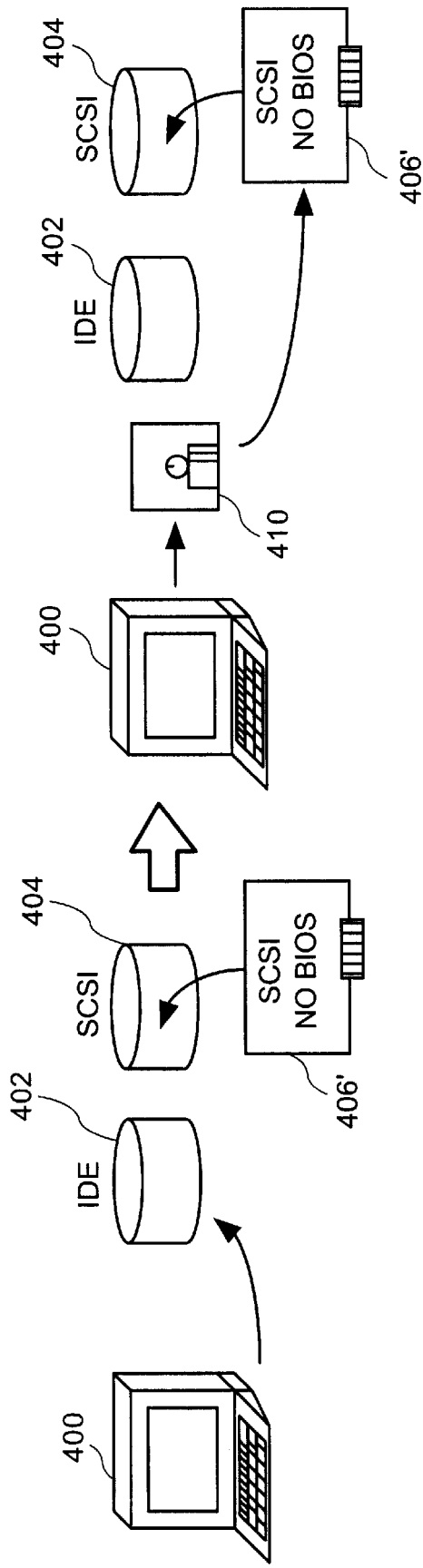

FIGS. 4A and 4B pictorially illustrate the advantages of the present invention which will enable the user to boot from a desired hard drive in accordance with one embodiment of the present invention. For example, FIG. 4A shows a computer system 400 which includes an IDE storage device 402, a SCSI storage device 404, and a host adapter 406 which includes a SCSI BIOS. When the computer system 400 does not have a floppy 410 that includes the boot code in accordance with one embodiment of the present invention, the computer system 400 will boot from the IDE storage device 402 by default. However, when the floppy disk 410 is inserted into the computer system, the system BIOS will first look to the floppy disk, load the boot code stored on the floppy disk, and enable the user to select a desired storage device to boot from. In this example, the user may desire to boot from a SCSI storage device 404 that is connected to a host adapter 406 that has a SCSI BIOS.

FIG. 4B illustrates a situation in which the SCSI storage device 404 is connected to a host adapter 406' that does not have a SCSI BIOS. Accordingly, without the floppy boot of the present invention, the computer system 400 in accordance with the system BIOS will only allow booting to the IDE storage device 402. However, when the floppy 410 of the present invention having the boot code is inserted into the floppy drive, the user will be able to selectively identify the SCSI storage device 404 to be the boot device (even when t he host adapter 406' does not have its own BIOS). This is made possible because the boot code in the floppy 410 will contain code that is typically stored in a hardware-type SCSI BIOS chip, and will load that SCSI BIOS for the host adapters that do not have their own SCSI BIOS chip integrated thereon. As a result, the user of the computer system 400 will be able to boot to the SCSI storage device 404 even in cases where the host adapter 406' does not have its own SCSI BIOS.

The invention employs various computer-implemented operations involving data stored in computer systems to drive computer peripheral devices (e.g., in the form of software drivers and ROM BIOS code). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for booting from a desired peripheral device that is connected to a computer system having a floppy disk drive, comprising:

inserting a floppy media into the floppy disk drive of the computer system;

turning ON the computer system to enable a system BIOS of the computer system;

executing a boot code stored on the floppy media, the boot code being configured to scan a number of buses of the computer system to identify host adapters that are connected to respective ones of the number of buses;

executing a BIOS code for each of the host adapters which causes an assignment of drive numbers to peripheral devices connected to the host adapters;

rearranging the drive numbers assigned to the peripheral devices in order to assign 80$h$ to the desired peripheral device; and booting the computer system from the desired peripheral device.

2. A method for booting from a desired peripheral device that is connected to a computer system having a floppy disk drive as recited in claim 1, wherein the operation of executing a BIOS code for each of the host adapters further comprises:

for each host adapter, determining whether an identified host adapter has a hardware BIOS chip; and if the identified host adapter does not have the hardware BIOS chip;

loading a BIOS image for the identified host adapter from the floppy media.

3. A method for booting from a desired peripheral device that is connected to a computer system having a floppy disk drive as recited in claim 2, wherein when the computer system is to be booted from the desired peripheral device, the method includes:

loading a boot code from a master boot record (MBR) of a media of the desired peripheral device; and executing the boot code.

4. A method for booting from a desired peripheral device that is connected to a computer system having a floppy disk drive as recited in claim 1, wherein the number of buses are PCI buses.

5. A method for booting from a desired peripheral device that is connected to a computer system having a floppy disk drive as recited in claim 4, wherein the scanning is configured to identify a type of the host adapters that are connected to the respective ones of the PCI buses.

6. A method for booting from a desired peripheral device that is connected to a computer system having a floppy disk drive as recited in claim 5, wherein the type of host adapters is one having a BIOS and one not having a BIOS.

7. A method for booting from a desired peripheral device that is connected to a computer system having a floppy disk drive as recited in claim 6, wherein when the host adapter is one not having a BIOS, a BIOS image is loaded from the floppy media.

8. A method for booting from a desired peripheral device that is connected to a computer system having a floppy disk drive as recited in claim 7, further comprising:

determining whether the host adapter not having a BIOS has the desired peripheral device connected thereto; and erasing the BIOS image that is loaded from the floppy media from memory if the host adapter not having a BIOS does not have the desired peripheral device connected thereto.

9. A method for booting from a desired peripheral device that is connected to a computer system having a floppy disk drive as recited in claim 1, wherein the desired peripheral device is selected from a group consisting of a second hard drive, and a removable storage media drive.

10. A computer implemented method for enabling booting to a desired drive of a computer system having a floppy drive, an IDE/EIDE storage drive, and a SCSI storage drive, the computer system being configured to receive a floppy disk that is configured to be inserted into the floppy drive, the floppy disk having a media containing program instructions that are configured to be executed upon initiating a system BIOS of the computer system, the execution of the program instructions comprising:

executing a boot code stored on the media of the floppy disk, the boot code being configured to scan a number of PCI buses of the computer system to identify host adapters that are connected to respective ones of the number of PCI buses;

executing a BIOS code for each of the host adapters which causes an assignment of drive numbers to devices connected to the host adapters and the computer system; and swapping the assignment of drive numbers such that the desired drive is assigned a drive number 80$h$.

11. A computer implemented method for enabling booting to a desired drive of a computer system as recited in claim 10, wherein the executing a BIOS code for each of the host adapters further comprises:

determining whether a selected host adapter has a BIOS; and loading an image BIOS code from the media of the floppy disk for the selected host adapter if it does not have a BIOS.

12. A computer implemented method for enabling booting to a desired drive of a computer system as recited in claim 11, further comprising:

executing the image BIOS code for the selected host adapter when it does not have a BIOS.

13. A computer implemented method for enabling booting to a desired drive of a computer system as recited in claim 12, further comprising:

deleting the image BIOS code from a RAM memory of the computer system if the desired drive is not connected to the computer system.

14. A computer implemented method for enabling booting to a desired drive of a computer system as recited in claim 10, further comprising:

determining whether the desired drive is connected to each one of the host adapters upon executing the BIOS code and before the swapping.

15. A computer implemented method for enabling booting to a desired drive of a computer system as recited in claim 14, wherein when the desired drive is already assigned drive number 80h, the operation of swapping is skipped.

16. A computer implemented method for enabling booting to a desired drive of a computer system as recited in claim 14, wherein the desired drive is selected from a group consisting of a removable media drive, and the SCSI storage drive.

17. A floppy disk computer readable media that is configured to be inserted into a floppy disk drive of a computer system, the floppy disk computer readable media contains program instructions that are configured to be executed first upon booting up of the computer system by a system BIOS, according to boot priority, the floppy disk computer readable media comprising:

program instructions for executing a boot code stored on the media of the floppy disk, the boot code being configured to scan a number of PCI buses of the computer system to identify host adapters that are connected to respective ones of the number of PCI buses;

program instructions for executing a BIOS code for each of the host adapters which causes an assignment of drive numbers to devices connected to the host adapters and the computer system;

program instructions for swapping the assignment of drive numbers such that a desired drive is assigned a drive number 80h.

18. A floppy disk computer readable media that is configured to be inserted into a floppy disk drive of a computer system as recited in claim 17, wherein the desired drive is selected from a group consisting of a removable storage media drive, and a SCSI storage media.

19. A floppy disk computer readable media that is configured to be inserted into a floppy disk drive of a computer system as recited in claim 18, wherein the program instructions for executing a BIOS code for each of the host adapters further comprises:

program instructions for determining whether a selected host adapter has a BIOS; and program instructions for loading an image BIOS code from the floppy disk computer readable media for the selected host adapter if the selected host adapter does not have a BIOS.

20. A floppy disk computer readable media that is configured to be inserted into a floppy disk drive of a computer system as recited in claim 19, further comprising:

program instructions for determining whether the desired drive is connected to the selected host adapter; and program instructions for erasing the image BIOS code from a RAM memory of the computer system if the desired drive is not connected to the selected host adapter.

* * * * *